April 2, 1963 A. C. JERMYN 3,083,462
DEVICE FOR SETTING AND MAINTAINING THE AXIS OF A CUTTING
ELEMENT NORMAL TO A PREDETERMINED PLANE
Filed Aug. 13, 1959 4 Sheets-Sheet 1
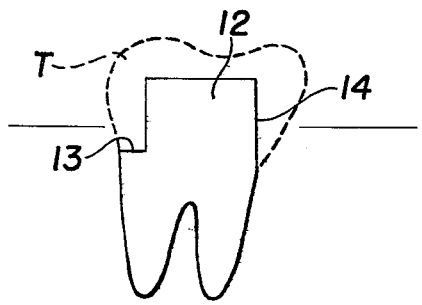
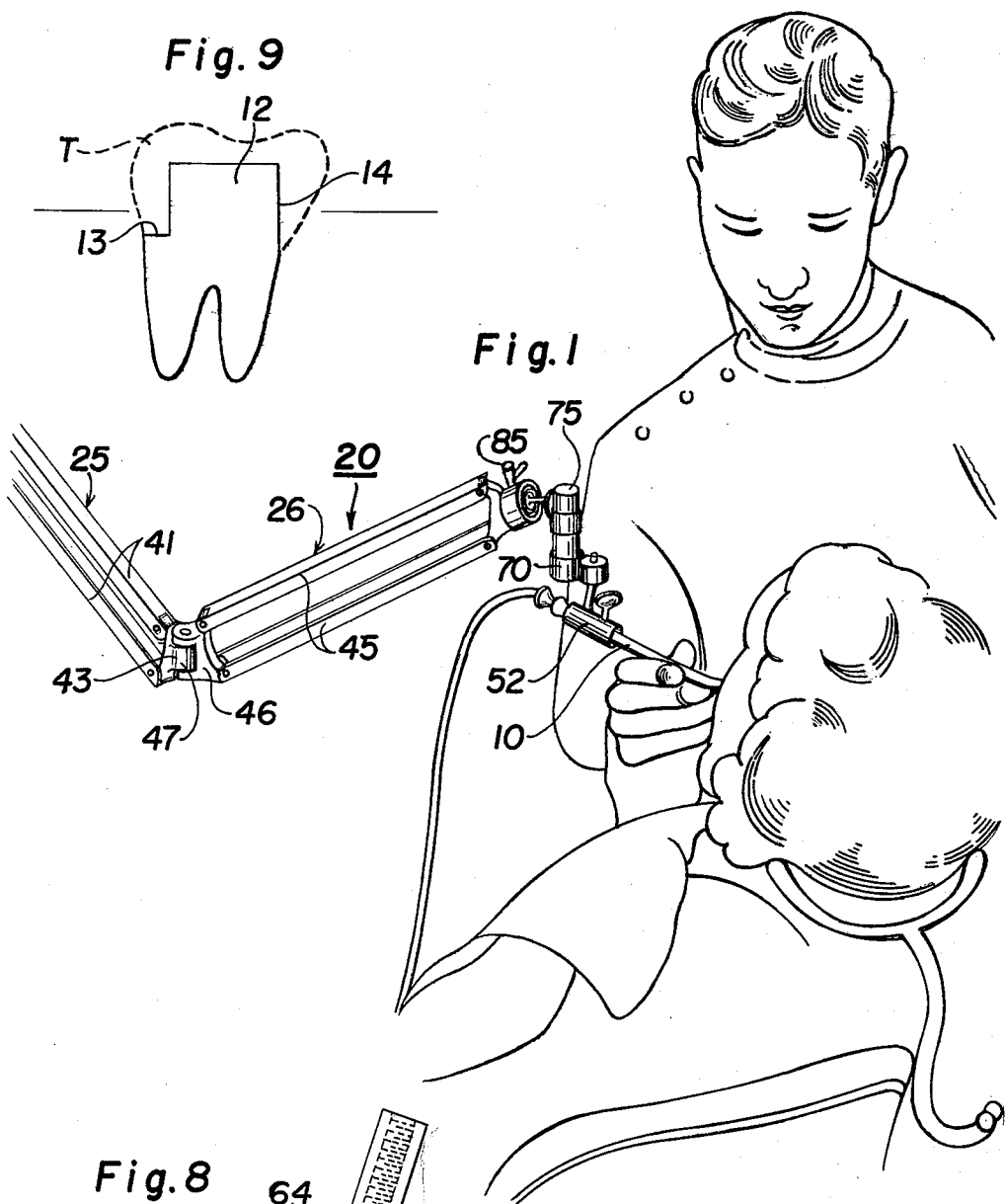
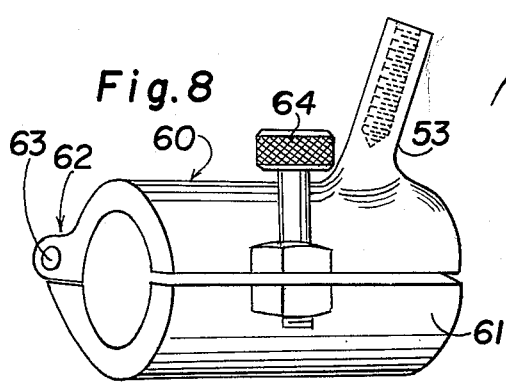
*Arthur C. Jermyn*
INVENTOR.
BY *Lloyd F. Seebach*
AGENT

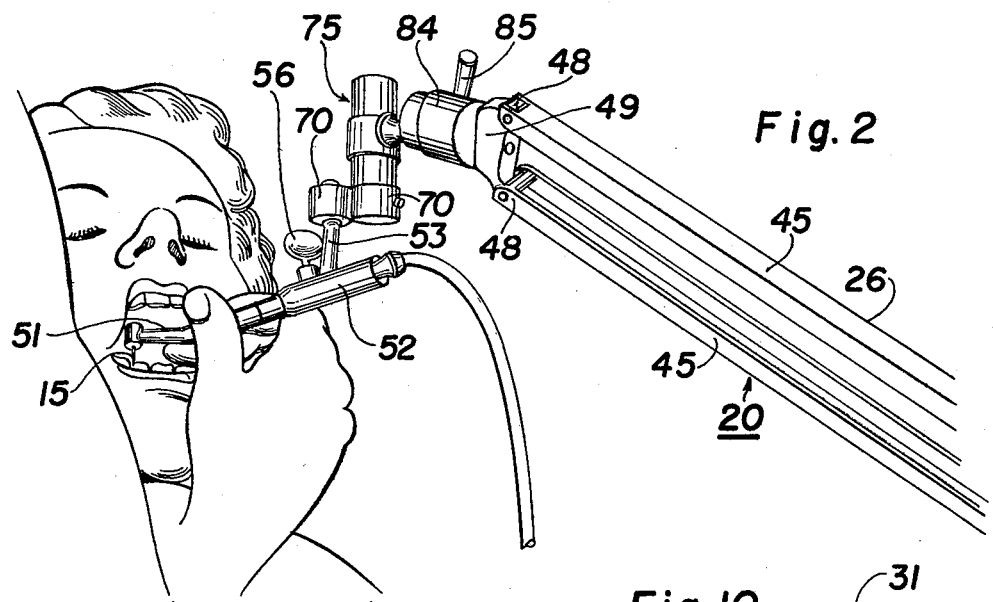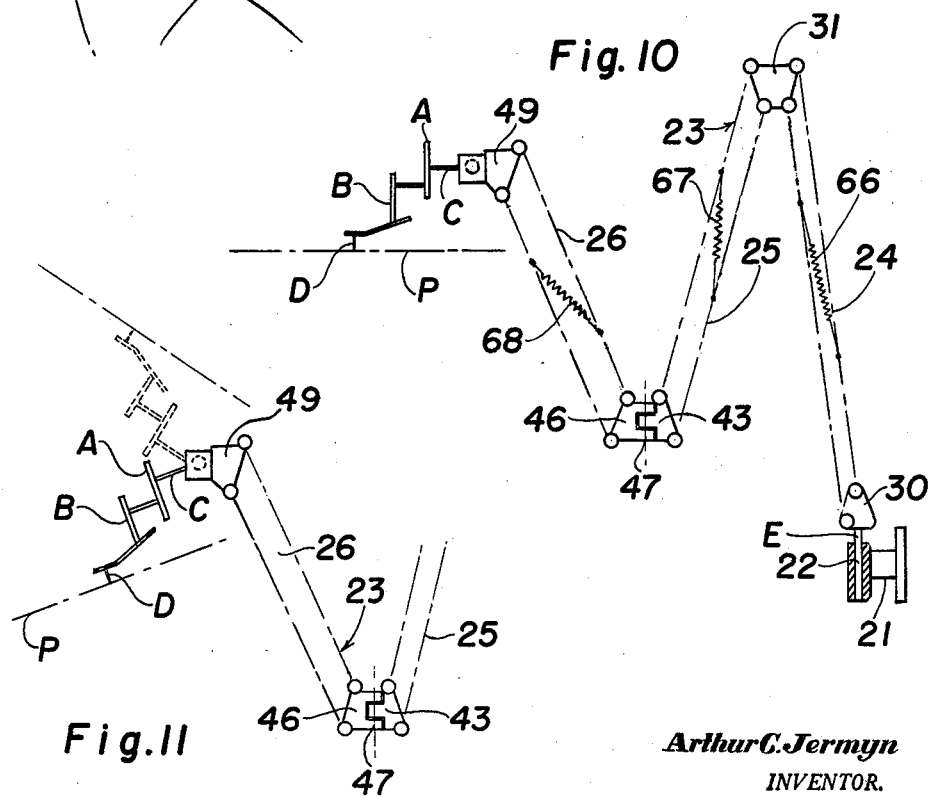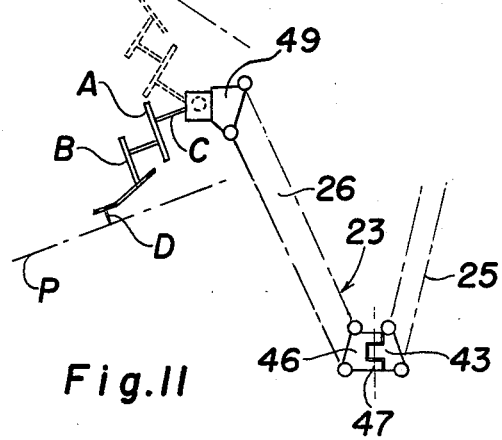

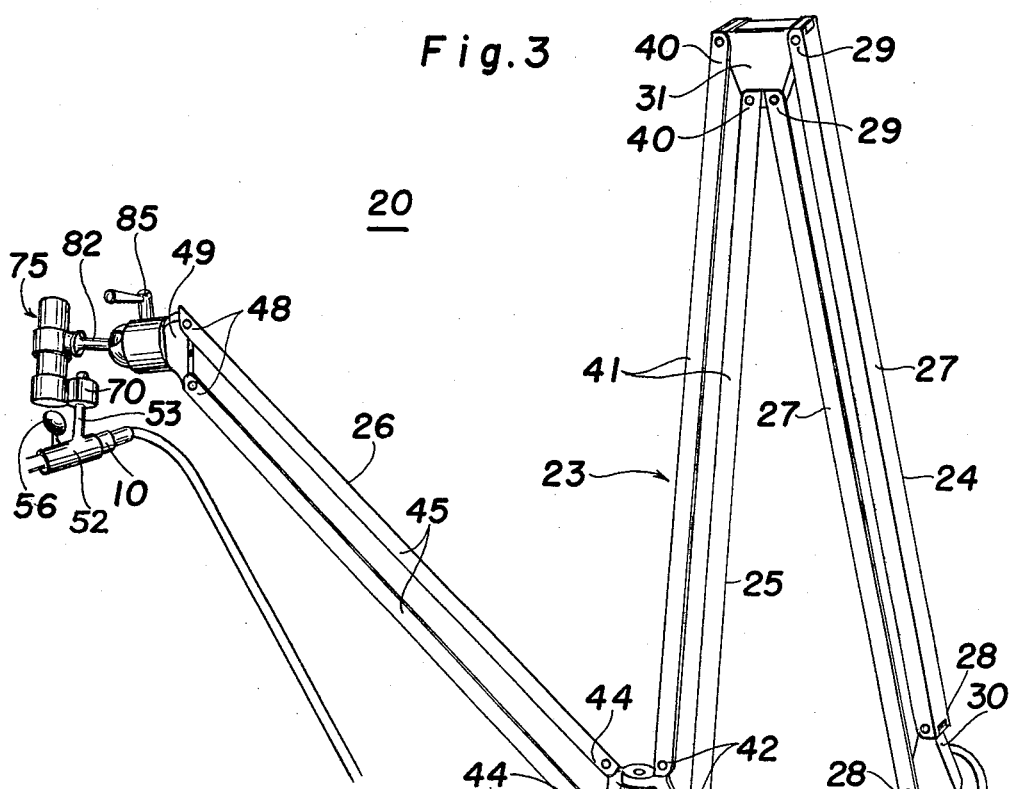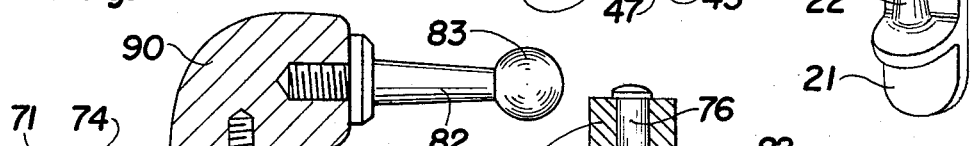

April 2, 1963 A. C. JERMYN 3,083,462
DEVICE FOR SETTING AND MAINTAINING THE AXIS OF A CUTTING
ELEMENT NORMAL TO A PREDETERMINED PLANE
Filed Aug. 13, 1959 4 Sheets-Sheet 4

Arthur C. Jermyn
INVENTOR.

BY Lloyd F. Seebach
AGENT

United States Patent Office 3,083,462
Patented Apr. 2, 1963

3,083,462
DEVICE FOR SETTING AND MAINTAINING THE AXIS OF A CUTTING ELEMENT NORMAL TO A PREDETERMINED PLANE
Arthur C. Jermyn, 240 Danbury Circle N., Rochester 18, N.Y.
Filed Aug. 13, 1959, Ser. No. 833,581
15 Claims. (Cl. 32—25)

This invention relates to dental apparatus and more particularly to a device for setting and maintaining the axis of a dental burr normal to the plane of occlusion.

Heretofore, in the preparation of a tooth for receiving a cap or a bridge, the tooth is usually cut to reduce the tooth to a substantially cylindrical shape extending to a surface just below the gum line. This is accomplished by utilizing a burr mounted in a handpiece and held by the operator who by visual observance attempts to cut the tooth whereby the cylindrical portion is perpendicular to the plane of occlusion and has a slight taper or draft to permit the cap to be readily positioned on the tooth. It can be appreciated that such cutting of a tooth requires a great deal of skill not only in handling the handpiece but also in being able to determine the relationship between the axis of the burr and the plane of occlusion. In such a case, the burr is mounted in the contra-angle of the handpiece which is driven in the usual way by a multiple-link belt drive means usually mounted on a standard, or which is driven by air if one of the newer types of handpieces is used.

The present invention is concerned with a device for receiving the handpiece and contra-angle and which can be adjusted for setting and maintaining the axis of the burr normal to the plane of occlusion. By means of this device, the operator need not be concerned about maintaining the position of the axis of the burr since once it has been properly set, it is always maintained in the proper position and, hence, the only concern of the operator is to direct and move the handpiece for the actual cutting of the portion of the tooth to be removed. With this arrangement, the handpiece is mounted in a device separate from the normal arrangement usually employed for receiving and driving the handpiece. The handpiece is mounted in a carrier which is rotatable about an angularly adjusted post and which also permits rotation of the handpiece about the axis of the carrier. The carrier is pivotally connected to one end of a pantograph which, in turn, is pivotally mounted on a wall bracket or a floor pedestal. By adjusting the carrier when the patient is in a position in which the plane of occlusion can be determined, the axis of the burr is then perpendicular to this plane regardless of the direction of movement of the handpiece. The device also lends itself very readily to cutting a tooth in either the upper or lower jaw.

The primary object of the invention, therefore, is to provide a device which permits and maintains the axis of a dental burr normal to the plane of occulsion.

A further object of the invention is to provide a device in which adjustment of a single member positions and maintains the axis of a dental burr normal to the plane of occlusion.

Another object of the invention is to provide a carrier for a handpiece which permits movement of the handpiece about two separate and distinct axes and in all positions of the handpiece maintains the axis of the burr normal to the predetermined plane of occlusion.

A still further object of the invention is to provide a parallel linkage for moving a carrier and the handpiece carried thereby whereby the same relationship between the carrier and handpiece exists in any position that the handpiece can assume.

And still another object of the invention is to provide a device comprising a minimum number of parts and which permits the axis of a dental burr to be easily positioned with respect to the plane of occlusion.

These and other objects of the invention will be apparent to those skilled in the art by the description which follows.

Reference is now made to the accompanying drawings wherein like reference numerals designate like parts and wherein:

FIGS. 1 and 2 are views showing a preferred form of the invention as used by an operator, and the position of the operator and patient;

FIG. 3 is a perspective view of the device showing the wall-mounting arrangement and the pantograph or linkage to which the carrier and the handpiece are connected;

FIG. 6 is a vertical section through the carrier showing the posts about which the holder is movable;

FIG. 7 is a view similar to FIG. 5 and shows a modified form of the carrier;

FIG. 8 is a perspective view of another form of holder for the handpiece;

FIG. 9 is a vertical section through a tooth showing a cut made with respect to a shoulder on one side and a chamfer on the other side; and FIGS. 10 and 11 are diagrammatic views of the linkages and the axes of the elements in relation to a horizontal plane and an angularly disposed plane, respectively.

Figure 4:
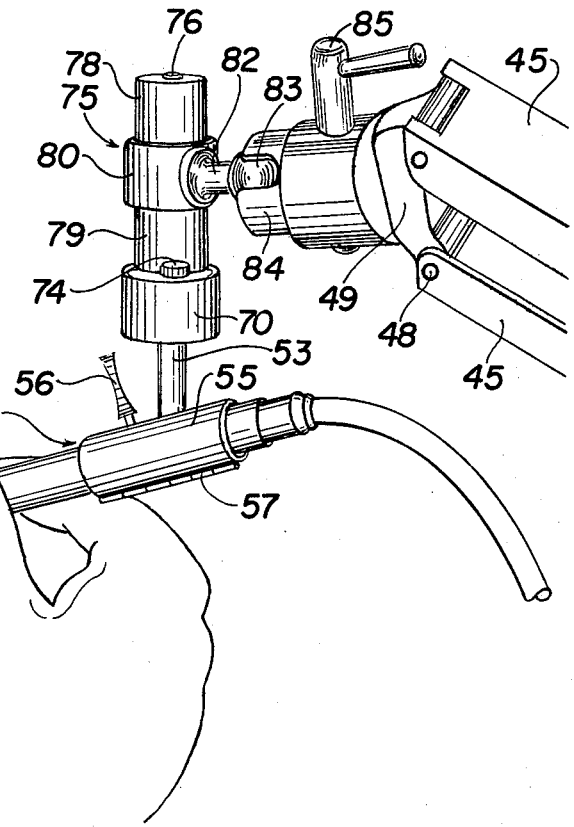
FIG. 4 is an enlarged perspective view of the end of the linkage to which the carrier and handpiece are connected, and shows the relationship of the dental burr to a horizontal plane of occlusion.
Figure 5:
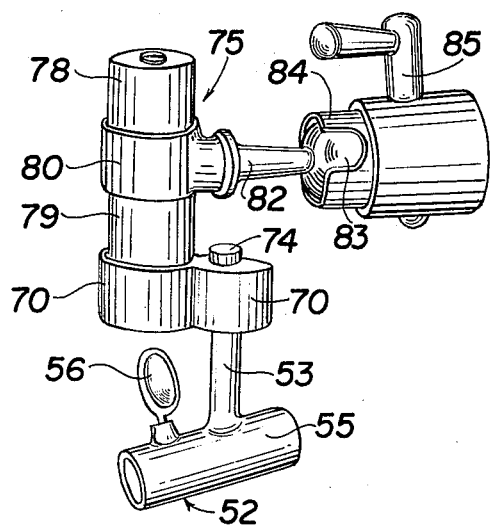
FIG. 5 is a perspective view of the carrier and the holder showing the coupling arrangement between the carrier and the end of the linkage.

A handpiece 10 of latest design can be driven by means of air, or if a conventional handpiece is used, by a conventional belt and pulley arrangement, with either a hand-held handpiece, or a hand-held and partially supported handpiece, it is necessary for the operator to guide all movements of the handpiece and, hence, of the burr 15 as well. As shown in FIG. 9, a tooth T is generally cut so that a central, substantially cylindrical portion 12 provides the means for securing the cap to the tooth. In such a case the tooth is usually cut to a shoulder or chamfer which is below the gum line. If such a tooth is a molar and located to the rear of the jaw, it can be readily appreciated that it is extremely difficult for the operator to cut a cylinder which is true in every respect, that is, substantially round, and the sides of which are normal to the shoulder 13 or chamfer 14. Further, when it is necessary to cut two such teeth which may be spaced from one another, to provide a bridge, the problem is still more complicated in that the axes of both cylindrical portions must be and should be parallel to provide the best fit for the bridge. Also, in the event two such teeth are not in the same plane of occlusion, then the possibility of cutting the portions 12 so that their axes are parallel is extremely remote. The same problem exists for preparation of a tooth to receive an inlay for which the device described herein can also be used.

To overcome the difficulties mentioned in the above paragraph and to ensure that all cuts that are made by the operator are normal to the established plane of occlusion, the device designated broadly by the numeral 20 in FIGS. 1 and 2 was developed. Device 20 is supported on a bracket 21 which is secured to a wall and is provided with a vertical post 22 on which the pantograph 23 is pivotally mounted. While the bracket or support means 21 is disclosed as a wall bracket, it is to be understood that such a support means can take the form of a floor pedestal or can be part of a standard dental unit.

Pantograph 23 in the preferred embodiment of the invention comprises three sets of parallel linkages designated by the numerals 24, 25, and 26. The linkage 24 comprises two U-shaped links 27 which have their respective ends 28 and 29 pivotally connected to the brackets 30 and 31, respectively. Bracket 21 is provided with a vertical bore (see FIG. 10) to receive post 22 and the ends 28 of links 27 are pivotally connected to spaced lugs carried by bracket 30. The other ends 29 of links 27 are pivotally connected to lugs on bracket 31 in a similar manner. A second pair of lugs on bracket 31 provide the means for pivotally connecting the ends 40 of links 41 of linkage 25 thereto and the other ends 42 of links 41 are pivotally connected to spaced lugs on a bracket 43 forming one-half of a hinged connection between the linkage 25 and linkage 26. Linkage 26 has the ends 44 of links 45 pivotally connected to spaced lugs on bracket 46 which forms the other half of hinged connection 47. Ends 48 of links 45 are pivotally connected to the spaced lugs on carrier bracket 49. It will be noted that the links 24, 25, and 26 comprise parallel linkages and are extendable in a vertical plane passing through the axes of the post 22. The purpose of the hinged connection 47 between linkages 25 and 26 will be apparent from the description which follows.

In order to make pantograph 23 self-retractable, that is, to make it assume a position in which it is maintained as close to post 22 as possible, links 27 are connected by a coil tension spring 66, links 41 are connected by spring 67 and links 45 are connected by spring 68, as shown in FIG. 10. Springs 66, 67 and 68 serve to maintain their respective links and, hence, the pantograph 23 in a retracted position until moved by the operator. These springs provide sufficient tension to ease the pantograph to its normal or retracted position without any snap or jar to disturb the setting of burr 15, if released by the operator when the pantograph is in an extended position. While a pantograph of the type disclosed herein comprises three pairs of linkages, as designated by 24, 25 and 26, it is to be understood that additional or fewer linkages may be used and that pantograph 23 may take forms other than that disclosed whereby the same result is obtained, namely, movement of burr 15 about post 22 and toward or away from said post.

Since the contra-angle 51 of a handpiece designated by numeral 10, as in FIG. 4, will vary with handpieces made by different manufacturers, the holder 52 for the handpieces 10 will be different; that is, the extension 53 provided on each holder will have to be arranged at a different angle with respect to the holder in accordance with the contra-angle, extension 53 being provided with a threaded hole 54 for a purpose about to be described.

As shown in detail in FIG. 6, a member 70 is provided with an axial stud 71 which is rotatably mounted in member 70 by means of bearings 72. Stud 71 has a threaded end 73 which is threaded into hole 54 in extension 53 of holder 52 by means of knurled head 74. By this arrangement, holder 52 as well as handpiece 10 is rotatable about the axis of stud 71. Member 70 is retained on carrier member 75 by means of stud 76 and is rotatable about this stud on bearings 77. Carrier member 75 comprises spacer blocks 78 and 79, and an intermediate member 80 in which stud 76 is also mounted by means of bearings 81. Member 80 is provided with an arm 82 which extends horizontally therefrom and which is perpendicular to the axis of stud 76. The end of arm 82 is provided with a spherical member or ball 83 which is received by a socket 84 carried and mounted on the end of bracket 49. By this arrangement carrier member 75 is coupled to the free end of pantograph 23.

With reference to FIGS. 6 and 10, it will be noted that the axis A of stud 76 and the axis B of stud 71 are parallel and both axes A and B are perpendicular to the axis C of arm 82. Also, the angular relation of holder 52 and handpiece 10 with respect to extension 53 and the axis B of stud 71 is such that the axis D of burr 15 is normal to the plane designated by the letter P. In the relation shown in FIG. 10, it will also be noted that the axis A of stud 76 and the axis E of post 22 are parallel; and since linkages 24, 25 and 26 will provide straight-line motion, the burr 15 can be moved in either direction in the plane of the drawing without changing relationship of its axis to the plane. Also, in the same relationship, the burr 15 can be moved about the axis A of stud 76 as well as about the axis of B of stud 71. In addition to movement about axes A, B or E, burr 15 can also be rotated or moved about the axis of hinged connection 47. Accordingly, any one or combinations of these various movements can be imparted to burr 15 by the operator, the axis D of burr 15 always being maintained normal to the plane to which it has been set. For this reason, that is, the various combinations of movements which are possible, the setting which is given to burr 15 is always maintained. In addition, each burr 15 is usually provided with a slight taper so that the draft required to permit easy mounting and withdrawing of a cap is obtained automatically with proper setting of the burr to the plane. This relationship is also shown in FIG. 4 in which the device 20 is shown being used to make a cut on an artificial denture 35, the denture being arranged in a horizontal plane.

With reference now to FIG. 11, upon changing the angle of plane P, it is necessary to merely change the angular relationship of axis A of stud 76 to axis E of post 22 to place the axis D of burr 15 normal to the plane P which, in this disclosure, can be the plane of occlusion. This is accomplished by releasing the locking means, designated broadly by the numeral 85 which is carried by bracket 49. This locking arrangement is a well-known form of eccentric lock which clamps ball 83 on arm 82, and it is believed no further description thereof is necessary. Upon releasing locking means 85, arm 82 is freely movable in socket 84 and can be readily adjusted whereby the axis D of burr 15 is perpendicular to the plane P. In this adjusted relationship, the handpiece 51 needs to merely be guided by the operator to make the necessary cuts, all of which will be normal to the plane P and in this case the plane of occlusion. Locking means 85 can be removed in the event ball 83 and socket 84 are made so that frictional engagement of these parts will hold them in any adjusted position.

A modified form of carrier is disclosed in FIG. 7 in which arm 82 is carried by an elbow 90 which also receives the threaded end of a stud 91. Stud 91 is utilized to secure member 70 to elbow 90 and rotates about its axis in the same manner as shown in the embodiment disclosed in FIG. 6. This embodiment is more compact and, of course, utilizes fewer parts. In either embodiment, however, the same functions are obtained; that is, movement of member 70 about stud 76 or stud 91 and rotation of holder 52 about the axis of stud 71.

The holder 52 with handpiece 10, as shown in FIG. 4, comprises a cylindrical sleeve 55 in which the handpiece is inserted and retained by a wing nut 56 which engages the handpiece to lock it in position. Sleeve 55 can be split and hinged at 57, as shown in FIG. 6. In FIG. 8, another embodiment of a holder 60 is disclosed in which the cylindrical portion 61 is made in two pieces and hinged at 62 by means of pin 63. The handpiece 10 is clamped in position by the finger screw 64 arranged on the side of portion 61. As shown in FIG. 8 and as mentioned above, the angle of the extension 53 with respect to the axis of the holder or handpiece will vary with the handpiece used by the operator.

With the establishment of the plane of occlusion by proper positioning of the patient's head, as shown in FIG. 1, the locking means 85 is released to permit adjustment of stud 76 for positioning the axis D of the burr 15 normal to the plane of occlusion. Once the position of the axis of burr 15 has been established, locking means 85 is actuated to lock arm 82 in the adjusted position.

With the mounting of handpiece 10 as described above, the operator can move the handpiece about the axis of stud 72, about the axis of stud 76, or about the axis of post 22 through the linkages 24, 25 and 26. Movement of the handpiece in a forward or backward direction is also accomplished through the pantograph device 23. In view of the mounting of handpiece 10 it can be readily appreciated that any one or combination of the movement which is described can be accomplished for the desired cut.

While the device has been shown and described with respect to a plane of occlusion which would be with respect to the lower jaw, the device is also readily adaptable to the plane of occlusion as determined by the upper jaw. To adjust the device to the latter plane of occlusion locking means 85 is released and the carrier member is rotated through an angle of 180° which positions the burr for cutting in this other plane of occlusion. The arm 82 is adjusted in exactly the same way for establishing the axis of the burr normal to the upper plane of occlusion. This is shown in FIG. 11 by the schematic arrangement of the parts shown in dotted lines.

While the device has been disclosed and described with respect to a dental burr, it can be readily appreciated that the device can be used for maintaining the axis of any cutting element normal to a given plane. For example, the device can be used with a stylus mounted in the end of a handpiece similar to a dental handpiece or a small milling cutter such as used by hobbyists to not only support the cutting tool, but also to set and maintain the cutting element in a relationship to the surface being acted upon.

Accordingly, various modifications of the device described herein will be apparent to those skilled in the art. The invention therefore is not to be limited to the disclosure, but is defined by the appended claims.

Having now particularly described my invention, what I desire to secure by Letters Patent of the United States and what I claim is:

1. A device for retaining a rotatable cutting element so upon movement thereof with respect to a support therefor the axis thereof is always at a predetermined angle to a predetermined plane, said device comprising a support means, a pantograph linkage having one end pivotally mounted on said support means about a vertical axis and extendable in a vertical plane passing through said vertical axis, a holder for said cutting element, and means adjustably coupled to and movable with the other end of said linkage receiving and securing said holder to secure said holder and said cutting element as a unit to said linkage, said receiving means having an axis which is normally in said vertical axis and being movable to position the axis thereof with respect to said vertical axis to set and maintain the axis of said cutting element at said predetermined angle.

2. A device in accordance with claim 1 wherein said other end of said linkage includes means for locking said receiving means in the angularly adjusted position.

3. A device for retaining a dental handpiece so upon movement thereof with respect to a support therefor the axis of the dental burr in said handpiece is always at a predetermined angle to the plane of occlusion, said burr being rotatably mounted in said handpiece, said device comprising a support means, a parallelogram linkage having one end pivotally mounted on said support means for movement about a vertical axis and extendable in a vertical plane passing through said vertical axis, a holder for said handpiece having an extension arranged at an angle to the axis of said holder, and means adjustably coupled to and movable with the other end of said linkage receiving and securing said extension to secure said holder and said handpiece as a unit to said linkage, said receiving means having an axis which is normally in said vertical plane and parallel to said vertical axis and being movable to position the axis thereof with respect to said vertical axis to set and maintain the axis of said burr at said predetermined angle.

4. A device for retaining a dental handpiece so upon movement thereof with respect to a support therefor the axis of the dental burr in said handpiece is always at a predetermined angle to the plane of occlusion, said burr being rotatably mounted in said handpiece, said device comprising a support means, a parallelogram linkage having one end pivotally mounted on said support means, movable on said means about a vertical axis and extendable in a vertical plane through said vertical axis, a holder for said handpiece having an extension arranged at an angle to the axis of said holder, means adjustably coupled to and movable with the other end of said linkage receiving and securing said extension to secure said holder and said handpiece as a unit to said linkage, said receiving means having an axis which is normally in said vertical plane and parallel to said vertical axis and being movable to position the axis thereof with respect to said vertical axis to set the axis of said burr at said predetermined angle, and means arranged on the other end of said linkage for operatively engaging and locking said receiving means to retain it in the angularly adjusted position.

5. A device for retaining a dental handpiece so upon movement thereof with respect to a support therefor the axis of the dental burr in said handpiece is always at a predetermined angle to the plane of occlusion, said burr being rotatably mounted in said handpiece, said device comprising a support means, a parallelogram linkage having one end pivotally mounted on said support means, movable on said support means about a vertical axis and extendable in a vertical plane passing through said vertical axis, a holder for said handpiece having an extension arranged at an angle to the axis of said holder, coupling means arranged on the other end of said linkage, and means operatively connected to said coupling means receiving and securing said extension to rotatably secure said holder and said handpiece as a unit to said linkage, said receiving means having an axis which is normally in said vertical plane and parallel to said vertical axis and being movable to position the axis thereof with respect to said vertical axis to set and maintain the axis of said burr at said predetermined angle.

6. A device in accordance with claim 5 and including means carried by said coupling means and engaging said receiving means for locking said receiving means in the angularly adjusted position.

7. A device for retaining a dental handpiece so upon movement thereof with respect to a support therefor the axis of the dental burr in said handpiece is always at a predetermined angle to the plane of occlusion, said burr being rotatably mounted in said handpiece, said device comprising a support means, a parallelogram linkage having one end pivotally mounted on said support means for movement about a vertical axis and extendable in a vertical plane passing through said axis, a holder for said handpiece having an extension arranged at an angle to the axis of said holder, a carrier member having a post and an arm arranged perpendicular to each other, coupling means carried by the other end of said linkage receiving and securing said arm to adjustably secure said carrier member to said linkage, and a member rotatably mounted on said post and including means offset with respect to said post receiving and securing said extension to rotatably secure said holder and said handpiece as a unit to said linkage for movement about the axis of said extension and about the axis of said post, the axis of said post being normally in said vertical plane and parallel to said vertical axis and with said arm being movable with respect to said coupling means to position the axis of said post with respect to said vertical axis to set and maintain the axis of said burr at said predetermined angle.

8. A device in accordance with claim 7 and including means carried by said coupling means and engaging said arm for locking said carrier member in the angularly adjusted position.

9. A device in accordance with claim 7 wherein said coupling means comprises a socket for pivotally receiving a spherical member on said arm.

10. A device in accordance with claim 7 wherein said member is rotatably mounted on said post to permit movement of said holder about the axis of said post.

11. A device in accordance with claim 7 wherein the axis of said extension on said holder is always parallel to the axis of said post for all positions of said carrier member.

12. A device for retaining a dental handpiece so upon movement thereof with respect to a support therefor the axis of the dental burr in said handpiece is always at a predetermined angle to the plane of occlusion, said burr being rotatably mounted in said handpiece, said device comprising a support means, a pantograph comprising at least two interconnected parallelogram linkages having one free end of said linkages pivotally mounted on said support means for movement about a vertical axis and extendable in a vertical plane passing through said axis, a holder for said handpiece having an extension arranged at an angle to the axis of said holder, and means adjustably coupled to and movable with the other free end of said linkages receiving and securing said extension to secure said holder and said handpiece as a unit to said pantograph, said receiving means having an axis which is normally in said vertical plane and parallel to said vertical axis and being movable to position the axis thereof with respect to said vertical axis to set and maintain the axis of said burr at said predetermined angle.

13. A device for retaining a dental handpiece so upon movement thereof with respect to a support therefor the axis of the dental burr in said handpiece is always at a predetermined angle to the plane of occlusion, said burr being rotatably mounted in said handpiece, said device comprising a support means, a pantograph comprising three interconnected parallelogram linkages, the free end of the first linkage being pivotally mounted on said support means for movement about a vertical axis and said third linkage being pivotally connected to the second linkage for movement independently of the first and second linkages, said linkages being extendable in a vertical plane passing through said vertical axis, a holder for said handpiece having an extension arranged at an angle to the axis of said holder, and means adjustably coupled to and movable with the free end of the third linkage receiving and securing said extension to secure said holder and said handpiece as a unit to said pantograph, said receiving means having an axis which is normally in said vertical plane and parallel to said vertical axis and being movable to position the axis thereof with respect to said vertical axis to set and maintain the axis of said burr at said predetermined angle.

14. A device for retaining a dental handpiece so upon movement thereof with respect to a support therefor the axis of the dental burr in said handpiece is always at a predetermined angle to the plane of occlusion, said burr being rotatably mounted in said handpiece, said device comprising a support means, a pantograph comprising three interconnected parallelogram linkages, the free end of the first linkage being pivotally mounted on said support means for movement about a vertical axis and said third linkage being pivotally connected to the second linkage for movement independently of the first and second linkages, said linkages being extendable in a vertical plane passing through said vertical axis, a holder for said handpiece having an extension arranged at an angle to the axis of said holder, a carrier member having a post and an arm arranged perpendicular to each other, coupling means carried by the free end of the third linkage receiving nad securing said arm to adjustably secure said carrier member to said pantograph, and a member rotatably mounted on said post and including means offset with respect to said post receiving and securing said extension to rotatably secure said holder and said handpiece as a unit to said carrier member for movement about the axis of said extension and about the axis of said post, the axis of said post being normally in said vertical plane and parallel to said vertical axis and with said arm being movable with respect to said coupling means to position said axis with respect to said vertical axis to set and maintain the axis of said burr at said predetermined angle.

15. A device in accordance with claim 14 and including means carried by said coupling means and engaging said arm for locking said carrier member in the angularly adjusted position.

References Cited in the file of this patent

UNITED STATES PATENTS 2,801,469     Solle     Aug. 6, 1957

FOREIGN PATENTS 390,671     Germany     Feb. 29, 1924